G. E. PETERS & G. GÜNTHER.
BIRD-CAGE.

No. 175,746. Patented April 4, 1876.

Witnesses.
Otto Hufeland.
Chas. Wahlers.

Inventors.
Geo. E. Peters
Gottlob Günther
per
Van Santvoord & Hauff
Attorneys.

UNITED STATES PATENT OFFICE.

GEORGE E. PETERS, OF JERSEY CITY HEIGHTS, NEW JERSEY, AND GOTTLOB GÜNTHER, OF NEW YORK, N. Y.

IMPROVEMENT IN BIRD-CAGES.

Specification forming part of Letters Patent No. 175,746, dated April 4, 1876; application filed January 27, 1876.

*To all whom it may concern:*

Be it known that we, GEORGE E. PETERS, of Jersey City Heights, in the county of Hudson and State of New Jersey, and GOTTLOB GÜNTHER, of the city, county, and State of New York, have invented a new and useful Improvement in Bird-Cages, which improvement is fully set forth in the following specification, reference being had to the accompanying drawing, in which—

Figure 1:
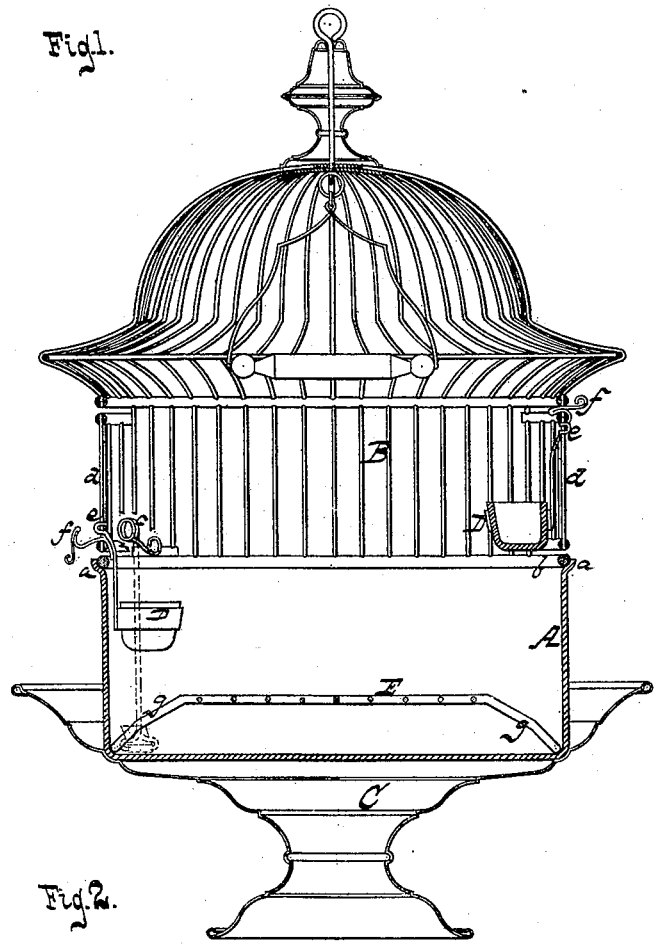
Figure 2:
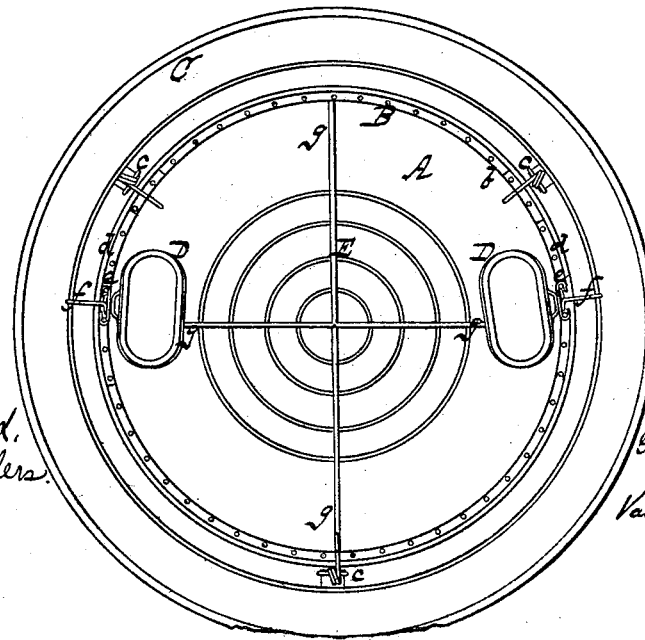

Figure 1 represents a vertical central section. Fig. 2 is a horizontal section.

Similar letters indicate corresponding parts.

This invention consists in the combination of a base vessel with an open-work cage, to which the feed-cups are attached, said base vessel being made either of a transparent or opaque material, so that food and water spilled by the bird is collected in said base vessel and the bird is prevented from soiling the floor round the cage, while the base vessel can be readily detached from the top part of the cage and cleaned; it consists, further, in the combination, with the open-work cage and with the base vessel, of feed-cup supporters, which have a rising and falling motion on the doors of the cage, so that by raising the cup-holders and opening the doors easy access can be had to the feed-cups; also, in the combination of a circular perch, made of open-work and provided with suitable feet or supports, with an open-work cage and a base vessel, so that the bird can easily reach the feed-cups from the perch, while the dirt and impurities drop through the open-work perch and collect on the bottom of the base vessel.

In the drawing, the letter A designates our base vessel, which is by preference made of glass, but which may be made of any transparent or semi-transparent material. It is closed at the bottom and open at the top, and in the example shown in the drawing it is provided with a shoulder, *a*, below its top edge, said shoulder serving to support the bottom cross band *b* of the open-work cage B. If desired, however, the base vessel may be made in such a shape that it fits into the body B of the cage, and that it can be slipped into said body from below, or that said body can be placed over it and fastened to the base C in the usual manner.

If the base vessel A is constructed with the supporting-shoulder *a*, suitable hooks or latches *c* are provided, which are hinged or otherwise secured to the base C, and which serve to fasten the body B down on the supporting-shoulder of the base vessel. The flange or rim of the base vessel, which rises above the shoulder *a*, retains the bottom crossband of the body B in the proper central position.

The body B of our cage is provided with doors *d*, which are situated above the top edge of the base vessel A, and on these doors are secured the feed-cup supporters D. These supporters are made to conform to the shape of the feed-cup, either in the form of rings into which the feed-cups can be set, as shown in the drawing, or in any other suitable form or shape. Each of these supporters is connected to a slide, *e*, which can be moved up or down on the filling-wires of the appropriate door, and with each slide is combined a hook, *f*, which, when the slide is moved up, can be made to catch over the top cross-bar of the door, so that the supporter, together with its feed-cup, is retained in an elevated position. If the door is then opened, easy access can be had to the feed-cup for removing or reinserting the same.

On the bottom of the base vessel A is placed on open-work perch E, which is provided with feet *g*, so as to raise the same above the bottom of the base vessel. When the feed-cups are moved down, the bird can reach the contents of said feed-cups from the perch, and at the same time all dirt and impurities pass through said open-work perch and accumulate on the bottom of the base vessel, whence they can be readily removed.

What we claim as new and desire to secure by Letters Petent is—

1. The combination, with an open-work cage to which the feed-cups are attached, of a base vessel with a closed bottom and open at the top, substantially in the manner shown and described.

2. The base A, constructed with a shoulder, $a$, below its top edge, in combination with the bottom cross-band $b$ of the body B, and catches $c$, by means of which said base is secured to the body, substantially as and for the purposes set forth.

3. The combination, with the doors $d$ of a cage and with the base-vessel A, of sliding feed-cup supporters D, substantially as set forth.

4. The combination, with an open-work cage B, base vessel A, and feed-cups D, of a circular perch, E, made of open-work, and provided with feet $g$, whereby the perch is raised above the bottom of the base vessel, substantially as and for the purpose specified.

In testimony that we claim the foregoing we have hereunto set our hands and seals this 21st day of January, 1876.

GEORGE E. PETERS. [L. S.]
GOTTLOB GÜNTHER. [L. S.]

Witnesses:
GEORGE T. PETERS,
E. F. KASTENHUBER.